(12) United States Patent
Flannery et al.

(10) Patent No.: US 6,630,634 B2
(45) Date of Patent: *Oct. 7, 2003

(54) CAD CURSOR WITH ELECTRONICALLY MODIFIABLE TRANSPARENT DISPLAY

(75) Inventors: Michael R. Flannery, Sioux City, IA (US); Stephen P. Vossler, Sioux Falls, SD (US)

(73) Assignee: Gateway, Inc., Poway, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,751

(22) Filed: Jan. 28, 1999

(65) Prior Publication Data

US 2001/0026267 A1 Oct. 4, 2001

(51) Int. Cl.⁷ .................................................. G08C 21/00
(52) U.S. Cl. ............................. 178/18.01; 178/18.03; 178/18.1
(58) Field of Search ................................. 345/173, 156, 345/163, 328, 341, 326, 358, 157, 158, 159, 160, 161, 164, 167; 178/18.1, 19.01, 18.01–18.07

(56) References Cited

U.S. PATENT DOCUMENTS

| | | | |
|---|---|---|---|
| 4,181,952 A | * 1/1980 | Casey et al. ................ 364/515 |
| 4,809,351 A | * 2/1989 | Abramovitz et al. .......... 382/59 |
| 4,831,566 A | * 5/1989 | Matthews et al. ...... 364/571.05 |
| 4,873,398 A | 10/1989 | Hubby, Jr. ..................... 178/18 |
| 4,969,054 A | * 11/1990 | Tsuji et al. ................... 358/473 |
| 5,014,044 A | 5/1991 | Murray ........................ 340/710 |
| 5,132,673 A | * 7/1992 | Ciavarella et al. .......... 340/710 |
| 5,191,480 A | 3/1993 | Murray et al. ............... 359/808 |
| 5,237,647 A | * 8/1993 | Roberts et al. ............. 345/173 |
| 5,287,105 A | 2/1994 | Schlotterbeck et al. ....... 341/20 |
| 5,446,480 A | 8/1995 | Yoshida ...................... 345/157 |
| 5,581,670 A | * 12/1996 | Bier et al. ................... 395/326 |
| 5,583,540 A | 12/1996 | Kishi et al. ................. 345/157 |
| 6,130,666 A | * 10/2000 | Persidsky ................... 345/179 |

FOREIGN PATENT DOCUMENTS

GB  2193827 A  * 3/1987

\* cited by examiner

Primary Examiner—Vijay Shankar
(74) Attorney, Agent, or Firm—Scott Charles Richardson; J. M. Anglin; Schwegman Lundberg Woessner & Kluth

(57) ABSTRACT

A cursor is provided which has a cursor body and a lens holding portion. The lens holding portion has a liquid crystal display screen therein, adapted for use as a lens. Multiple cross-hairs can be displayed on the lens using the liquid crystal display screen, and can also be modified to display supplemental information on the liquid crystal display. At least two sensors can also be coupled with the cursor for re-orienting the cursor, and adjusting the displayed cross-hairs on the liquid crystal display relative to the orientation.

31 Claims, 4 Drawing Sheets

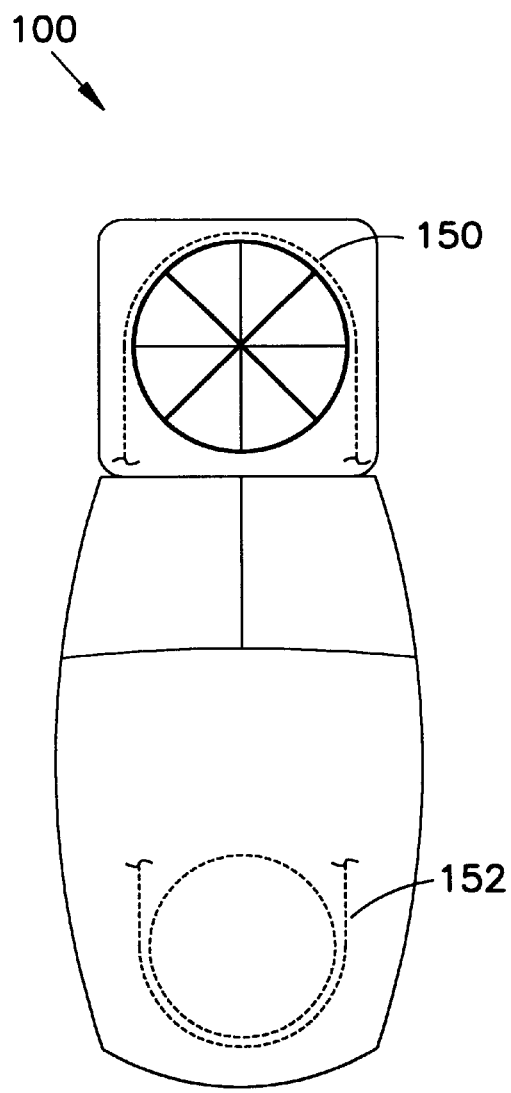
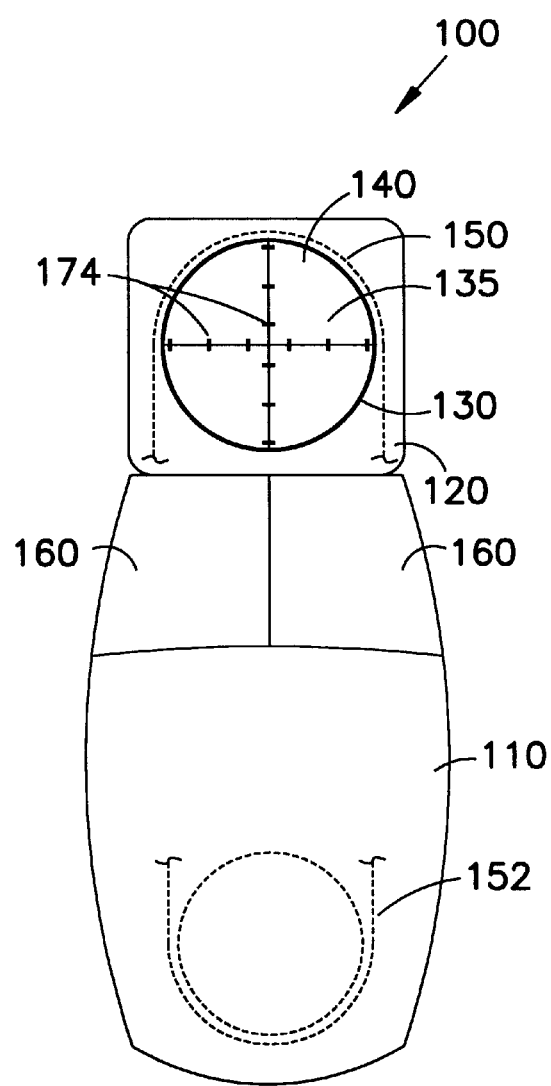
FIG. 4
FIG. 5

CAD CURSOR WITH ELECTRONICALLY MODIFIABLE TRANSPARENT DISPLAY

FIELD OF THE INVENTION

The present invention relates generally to digitizing systems. More particularly, it pertains to cursors for digitizing systems.

BACKGROUND OF THE INVENTION

Digitizing systems generally include a movable cursor which is used in conjunction with a tablet having a planar sensing surface. A sheet bearing a two-dimensional design, such as technical drawings, etc., is positioned on the sensing surface of the tablet and an operator manually moves the cursor on the surface of the sheet to trace selected features of the design. Cross-hairs in a position-sighting aperture of the cursor may be used to align the cursor with a desired feature of the design.

The operator directs a computer connected to the digitizer to perform a particular operation based on the coordinates relative to the tablet of a particular point on the sheet below the cross-hairs by pressing a selection button on the cursor. The coordinates of that particular point may then be used by the computer in accordance with a software program, e.g., a computer-aided design (CAD) program. The position coordinates of the desired feature are determined by an interaction between, for example, inductive or capacitive elements in the digitizing tablet and the cursor.

One drawback in using the cursor is operator error in determining the proper position for the cursor, which results in a significant limitation on digitizer accuracy. One approach to solving this drawback is to provide magnification of the details of the design which assist the operator in correctly positioning the cursor. One example of this approach is described in U.S. Pat. No. 5,014,044, issued to Murray on May 7, 1991. The Murray reference relates to a magnifying lens and a connector for mounting the magnifying lens to the cursor in a region near the cross-hairs of the cursor. However, a magnifying lens carried by a cursor to provide such desired magnification may interfere with use of the cursor when such magnification is unnecessary, or can become misplaced when the magnifying lens is removed from the cursor. In addition, the magnifying lens can restrict the operator's field of view in the area of the position-sighting aperture, and may interfere with the operator's ability to quickly recognize and locate desired details. Thus, while it may be desirable to magnify a surface below the cross-hairs to precisely position the cursor, it may also be desirable at other times to provide a clear line of sight for the operator to the position-sensing aperture. Another approach to solving this problem is described in U.S. Pat. No. 5,191,480 which relates to an accessory for improving the accuracy of digitizer cursors. However, accessories for digitizer cursors can become misplaced, and/or interfere with the lens portion of the digitizing cursor.

Another drawback of cursors is that an operator is typically limited to the cross-hairs associated with that particular hand-digitizer. However, different technical drawings or illustrations may require different cross-hairs for the lens portion. Different removable lenses can be coupled with the view portion of the digitizer which offer different cross-hairs arrangements. However, this requires an operator to change the lens for different applications requiring a different layout of cross hairs. In addition, the removable lens can also become misplaced from the digitizing cursor.

Another approach to hand-digitizers is described in U.S. Pat. No. 5,287,105 issued Feb. 15, 1994 to Schlotterbeck et al. Schlotterbeck relates to a cursor with a quasi-sight window having a charge coupled device (CCD) panel for viewing a 2-dimensional area and an LCD panel for displaying it to the user. The quasi-sight window is not transparent, and relies on the CCD to view and the LCD panel to display the view. However, a virtual display memory means is necessary for receiving and storing digital data from the CCD for outputting the digital data to drive the LCD panel, which requires additional circuitry for the digitizing cursor. The CCD camera also requires expensive components to be included with the digitizing cursor. In addition, the operator is prevented from directing viewing the illustration through the quasi-sight window.

Accordingly, what is needed is a cursor which can easily accommodate the different cross-hairs requirements. What is further needed is a digitizing cursor which does not interfere with the view ability of the lens portion.

SUMMARY OF THE INVENTION

A digitizing cursor for use with digitizing applications is provided where the cursor has a cursor body coupled with a lens holding portion. The lens holding portion has an aperture, which has a lens portion disposed within the aperture. The lens portion comprises a liquid crystal display which is adapted for viewing and displaying information to assist in positioning the cursor body. Alternatively, the liquid crystal display also has a transparent display made for allowing an unobstructed view of an area beneath the lens. In one embodiment, a plurality of actuation buttons are associated with the cursor body.

The lens portion, in one embodiment, is adapted to provide a variety of information and/or gradients displayed thereon. For instance, in one embodiment, the liquid crystal display has cross hairs displayed thereon. In another configuration, the liquid crystal display has a plurality of annular rings displayed thereon. In addition, the liquid crystal display can also have at least one character displayed thereon.

The digitizing cursor, in one embodiment, includes a first sensor and a second sensor. The first and second sensors are adapted for re-orienting the display of information on the lens portion.

A digitizing cursor system is also provided which is adapted for use with digitizing applications. In one configuration, the system includes a digitizing cursor as in the previously discussed embodiments, and also a digitizing tablet. In another configuration, the system also includes a computer operatively coupled therewith.

A method for digitizing information on a document is also disclosed. The method includes the steps of moving a digitizing cursor relative to a digitizing tablet, where the digitizing cursor includes a cursor body with a liquid crystal display lens portion, and a first and second sensor operatively coupled therewith. The orientation of the cursor is sensed with the first and second sensors, and then the display of information and/or gradient lines of the liquid crystal display are re-oriented based on the information from the first and second sensors.

The liquid crystal display beneficially allows an operator to directly view the image below the lens. The liquid crystal display provides an inexpensive alternative to other cursors requiring sophisticated electronic circuitry or other components, since expensive camera equipment is not required. Further, extensive circuitry is not required to display the image below the lens portion of the cursor since the operator can directly view it, and the liquid crystal display requires only a minimal supply of power. Supplemental information can be displayed on the liquid crystal display to aid the operator. A further benefit provided is that gradient lines can be modified on the liquid crystal display without having to change lenses or cursors. This feature allows for electronic selection of multiple gradients. In addition, the two sensors provided with the cursor allow for the display or the gradients to be reoriented to match the orientation of the digitizer pad.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 4 is a top plan view illustrating a digitizing cursor constructed in accordance with one embodiment of the present invention.

FIG. 5 is a top plan view illustrating a digitizing cursor constructed in accordance with one embodiment of the present invention.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims.

Figure 1:
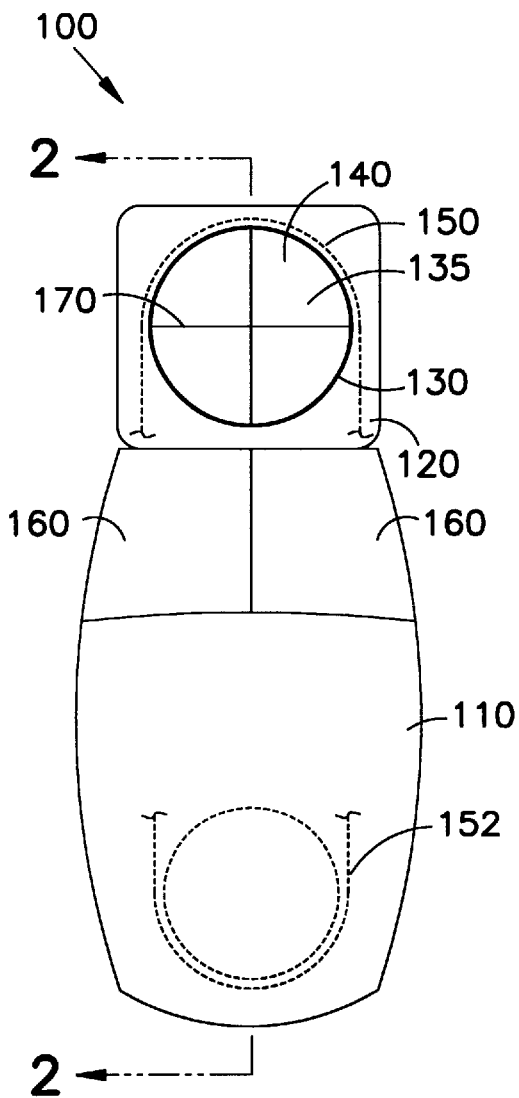
FIG. 1 is a top plan view illustrating a digitizing cursor constructed in accordance with one embodiment of the present invention.

A digitizing cursor 100, in one embodiment, is illustrated in FIG. 1. The digitizing cursor 100 includes a cursor body 110 and a lens holding portion 120, where the lens holding portion 120 has an aperture 130 therein. The aperture 130 contains a lens 135 which, in one embodiment, comprises a liquid crystal display 140. In another embodiment, the liquid crystal display 140 is transparent. In addition, the cursor 100 includes a first sensor 150 and a second sensor 152, as will be further discussed below. The cursor 100 also includes a plurality of actuation buttons 160 which are operatively coupled with the cursor 100.

The liquid crystal display 140 of the digitizing cursor 100 embodies typical LCD construction. The liquid crystal display 140 has two parallel and spaced apart glass plates with electrically conductive lines on their inner surfaces and a liquid crystal compound, typically of a clear organic material, encased and sealed between the glass plates. To align the liquid crystal modules in a fixed direction, fine grooves are formed on the glass plates. The glass plates of liquid crystal display 140 may also include commonly known light polarizers, colorizers and filters for producing a color image on the lens 135. The liquid crystal compound is clear until subjected to an electric field defined by the conductive lines. The liquid crystals of the compound, rearrange themselves, and orient relative to the applied field and act as an additional polarization filter layer according to the pattern of the applied field. When no voltage is applied, light passes through the liquid crystal display. When voltage is applied, the passage of ambient light is blocked and the screen appears black. Such a liquid crystal glass construction is well known in the art and, therefore, will not be described in further detail herein. It is through use of these concepts that the liquid crystal display of one embodiment is provided.

Figure 3:
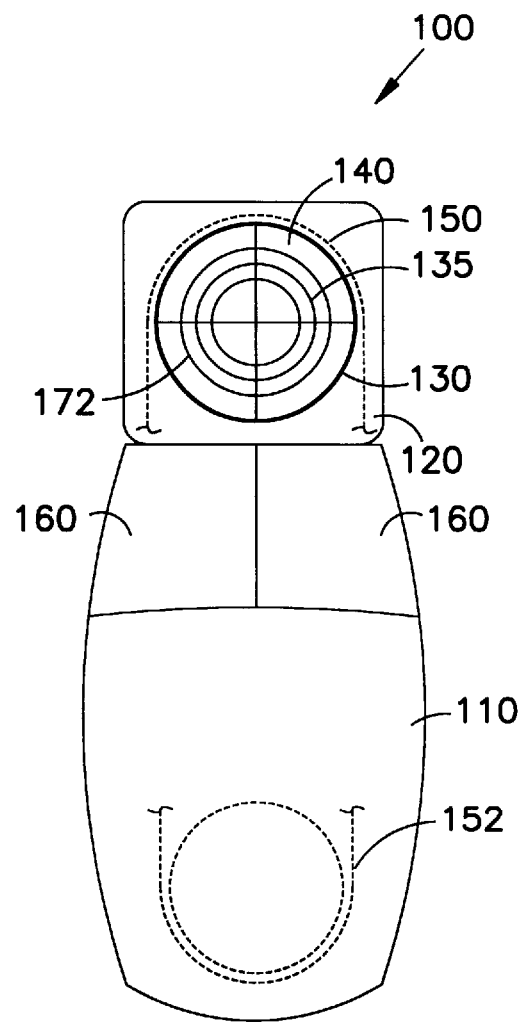
FIG. 3 is a top plan view illustrating a digitizing cursor constructed in accordance with one embodiment of the present invention.
Figure 2:
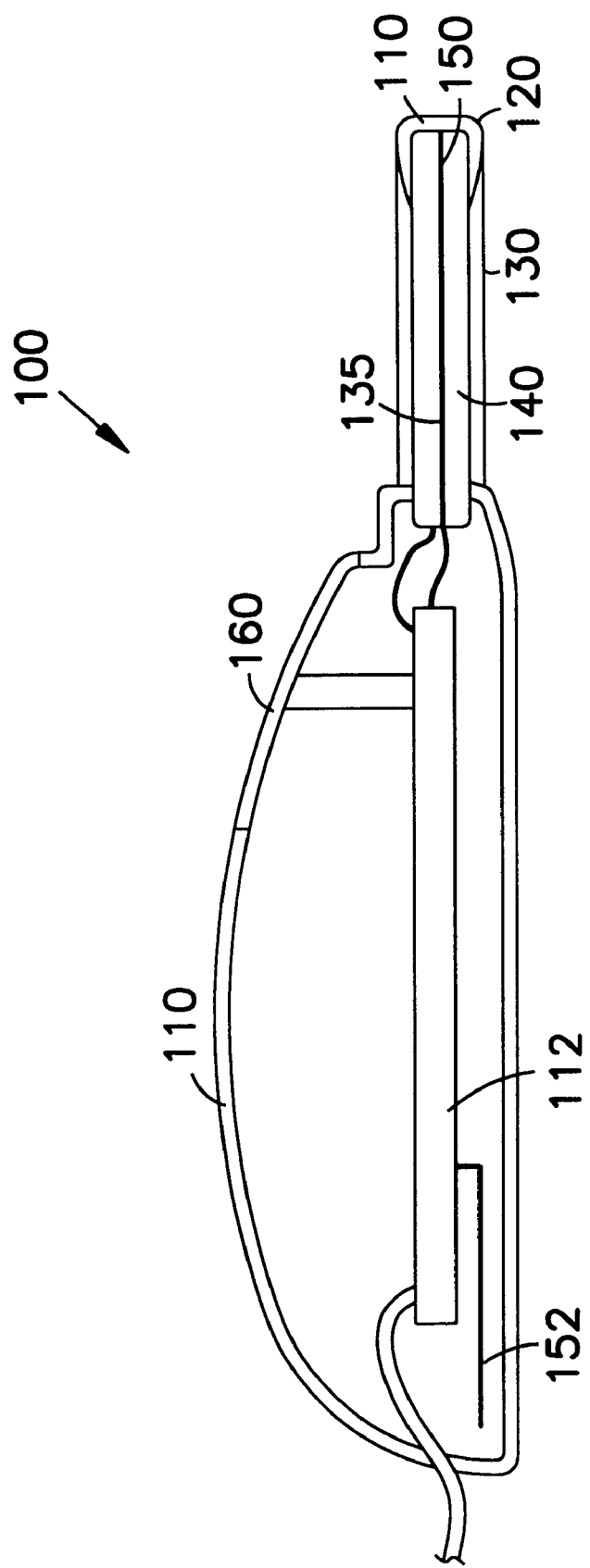
FIG. 2 is a sectional view taken from FIG. 1 along 2—2 illustrating a digitizing cursor constructed in accordance with another embodiment of the present invention.

For example, as illustrated in FIGS. 1, 3–5, various displays can be provided on the liquid crystal display 140 of the cursor 100. As shown in FIG. 2, the liquid crystal display 140 displays a standard cross-hairs 170 arrangement. The operator can view the two-dimensional area below the lens portion of the cursor 100 even when the cross-hairs 170 are shown. In another embodiment, as illustrated in FIG. 3, the liquid crystal display 140 shows a gradient having a plurality of annular rings 172. While the annular rings 172 are displayed on the lens 135, the operator can continue to view the two-dimensional portion beneath the lens 135 due to the light transmissive or translucent nature of the liquid crystal display 140. In yet another embodiment, as illustrated in FIG. 5, the liquid crystal display 140 shows another version of gradient lines 174. The operator can continue to view the two-dimensional area beneath the lens portion 135 due to the nature of the liquid crystal display 140.

The liquid crystal display 140, in another embodiment, is adapted to display information regarding movement of the cursor 100, for example, numerical readout of line length. For instance, as shown in FIG. 1, the liquid crystal display 140 can be adapted to display information regarding movement between data points selected by an operator. In this configuration, the digitizing cursor 100 sends and receives information to a computer system (FIG. 6) which is processed by software (not shown), as is know by those skilled in the art and will not be further discussed herein.

Some liquid crystal displays utilize ambient light to illuminate the display whereas many other liquid crystal displays utilize internal back lighting to illuminate and make visible the images created by the liquid crystal compound. The liquid crystal display 140 uses the ambient light reflected from a white or light colored tracing document 218 placed on the tablet 220 (See FIG. 6) to achieve its translucent or transparent appearance. Alternatively, the liquid crystal display 140 of the cursor 100 can be provided with back lighting other than, or in addition to, the white tracing document 218 of the tablet 220. For instance, reflectors (not shown) or low intensity bulbs (not shown) can also be provided, and are considered within the scope of the invention. One advantage of liquid crystal displays with back lighting is that they generally provide a more uniform image and one which is visible regardless of the level of ambient light, although may interfere with the translucence of the liquid crystal display 140.

Figure 6:
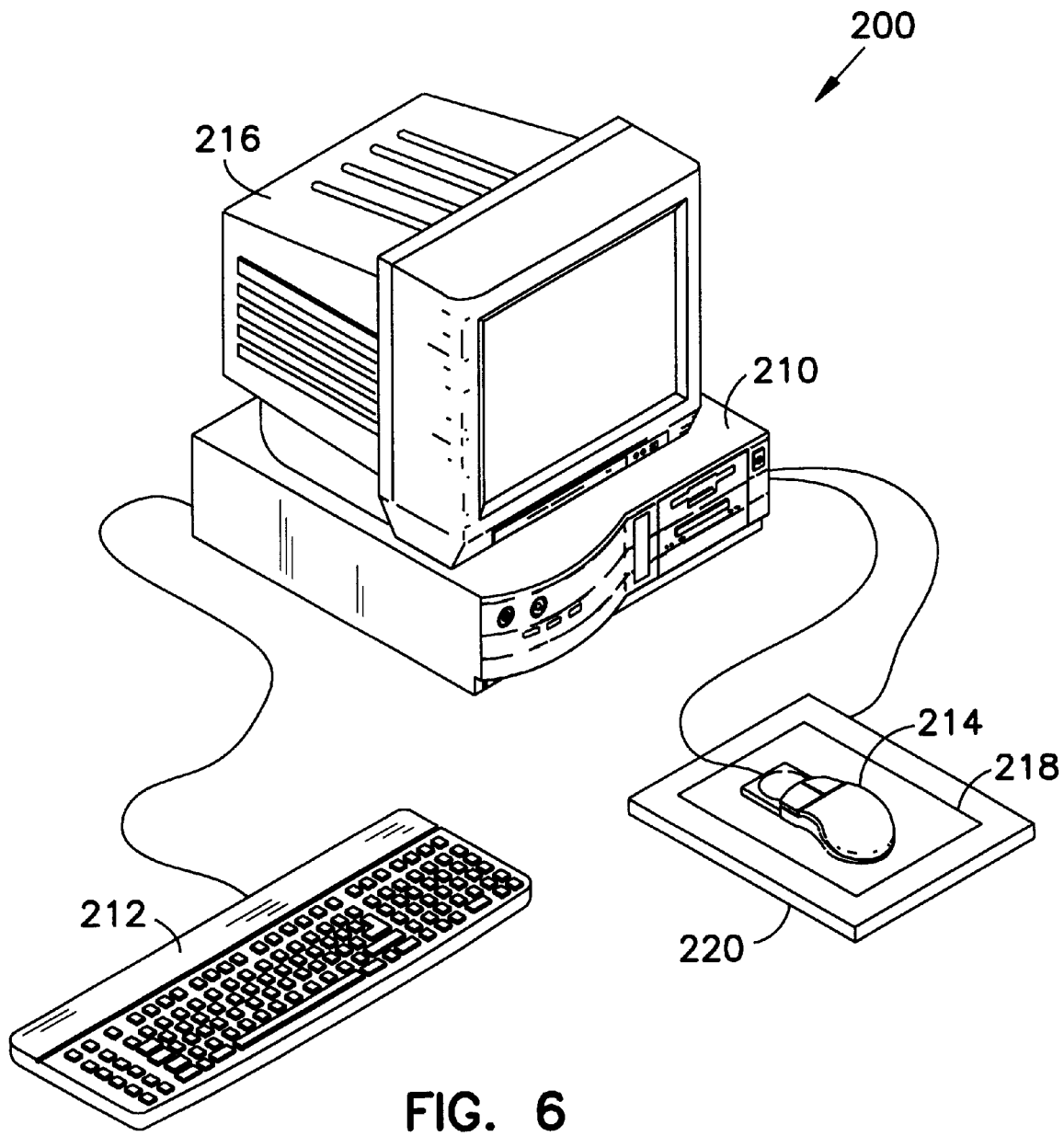
FIG. 6 is a perspective view illustrating a digitizing cursor, tablet, and computer constructed in accordance with another embodiment of the present invention.

The cursor 100 is illustrated in greater detail in FIG. 2. The cursor body 110 encompasses electronics 112 which are operatively coupled with the actuation buttons 160, the liquid crystal display 140, and the computer system 200 (FIG. 6). The actuation buttons 160 are adapted for the selection of data points by an operator as is known by those skilled in the art. In one embodiment, the cursor body 110 encompasses at least a portion of the liquid crystal display 140. Alternatively, in another embodiment, the cursor body 110 encompasses all of the liquid crystal display 140. A first sensor 150 is also provided with the cursor, which is adapted to submit information for the location of the cursor 100 when the operator actuates the selection buttons 160. In another embodiment, a second sensor 152 is provided which relays information to the computer system 152 regarding the orientation of the cursor 100. The first sensor 150 and the second sensor 152 are each operatively coupled with the electronics 112, which allows for the transmission of information. The first sensor 150 and the second sensor 152 each independently and/or collectively sense the orientation of the cursor 100. The details of operation of the first sensor 150 and the second sensor 152 are known by those skilled in the art and therefore will not be further discussed. The computer system 200 (FIG. 6) is adapted to re-orient an object displayed on the liquid crystal display 140 to indicate the current orientation. The term "object" is not intended to limit the re-orientable matter displayed on the liquid crystal display. For instance, "object" can include information, data, text, gradient lines, cross hairs, etc. One example of a display having re-orientated cross-hairs is shown in FIG. 4.

In another embodiment, a computer system 200 is provided, as illustrated in FIG. 6. The computer system 200 includes a computer 210, and may be of any type. The computer 210 usually includes an input device, such as a keyboard 212, and a display device 216. The display device 216 can be any of a number of different devices, such as a computer monitor employing a cathode ray tube (CRT), or a liquid crystal display. In addition, the computer system 200 includes a digitizing tablet 220 and a digitizing cursor 214. The digitizing cursor 214 and the digitizing tablet 220 are each operatively coupled with the computer system 200. The computer 210 typically has a program running thereon that provides for movement of a pointer on display device 16 in response to the user operating the digitizing cursor 214 over the digitizing tablet 220.

The digitizing cursor 214 allows a computer operator to move the pointer on the display device 216. The digitizing cursor 214 therefore translates movement by the user into an electronic signal sent to the computer via a communications link. The communications link can be a cable connecting the pointing device to the computer. Such a cable is usually integrated within the pointing device itself, and ends in a connector that plugs into a corresponding connector in the back of the computer.

Not shown is that the computer 210 typically includes a central-processing unit (CPU), a random-access memory (RAM), and a read-only memory (ROM), where the CPU, RAM, and ROM may be of any type. Also not shown is that the computer 210 also usually comprises a fixed storage device such as a hard disk drive, and a removable storage device such as a floppy disk drive.

Advantageously, the liquid crystal display allows an operator to directly view the image below the lens, and simultaneously provide a lens portion capable of easily modifying information displayed thereon. The liquid crystal display provides an inexpensive alternative, since expensive camera equipment is not required. Further, extensive circuitry is not required to display the image below the lens portion of the cursor since the operator can directly view it, and the liquid crystal display requires only a minimal supply of power. Supplemental information can be displayed on the liquid crystal display to aid the operator. A further benefit provided is that gradient lines can be modified on the liquid crystal display without having to change lenses or cursors. This feature allows for electronic selection of multiple gradients. In addition, the two sensors provided with the cursor allow for the display or the gradients to be reoriented to match the orientation of the digitizer pad.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A cursor for use with a sheet bearing an image, the cursor comprising:
   a body movable by an operator over the sheet;
   electronics for generating modifiable information representing any of a plurality of different objects;
   a transparent two-dimensional display mounted to the body in a manner such that a portion of the image on the sheet is visible to the operator through the display and coupled to the electronics such that the operator views a selected one of the objects superimposed upon the image portion of the sheet through the display.

2. A cursor for use with a sheet bearing an image, the cursor comprising:
   a body movable by an operator with respect to the image;
   electronics for generating modifiable information representing any of a plurality of different objects;
   a transparent two-dimensional display mounted to the body in a manner such that a portion of the image on the sheet is visible to the operator through the display and coupled to the electronics such that the operator views a selected one of the objects superimposed upon the image portion through the display,
   wherein the generated information is modifiable to display different gradients.

3. A cursor for use with a sheet bearing an image, the cursor comprising:
   a body movable by an operator with respect to the image;
   electronics for generating modifiable information representing any of a plurality of different objects;
   a transparent two-dimensional display mounted to the body in a manner such that a portion of the image on the sheet is visible to the operator through the display and coupled to the electronics such that the operator views a selected one of the objects superimposed upon the image portion through the display,
   where the generated information is modifiable to display different crosshairs.

4. The cursor of claim 1 where the generated information is modifiable to display alphanumeric characters.

5. The cursor of claim 1 where the electronics reorients the one object on the display.

6. The cursor of claim 5 where the one object is a crosshair.

7. The cursor of claim 5 where the electronics reorients the object in response to a reorientation of the body.

8. The cursor of claim 1 further comprising at least one actuation button on the body, the electronics being operatively coupled to the actuation button and to the display.

9. The cursor of claim 1 where at least some of the electronics are disposed within the body of the cursor.

10. The cursor of claim 1 where the display is a transparent liquid-crystal display (LCD).

11. The cursor of claim 10 where the LCD produces a color image.

12. The cursor of claim 10 where ambient light from the sheet illuminates the LCD.

13. The cursor of claim 10 where the transparent LCD is backlit.

14. A digitizing system, comprising:
   a tablet for carrying a sheet bearing an image;
   electronic circuits for generating modifiable information;
   a cursor body including a transparent display coupled to the circuits for viewing a portion of the sheet therethrough together with any of a plurality of objects represented by the modifiable information;
   at least one sensor coupled to the circuits for detecting the location of the cursor body relative to the tablet.

15. The system of claim 14 where the sensor detects the position of the cursor body on the tablet.

16. The system of claim 14 where the sensor detects the orientation of the cursor body on the tablet.

17. The system of claim 16 where the sensor is coupled to the circuits for modifying the displayed modifiable information in response to the orientation of the cursor body on the tablet.

18. The system of claim 14 where at least a portion of the circuits are disposed within the cursor body.

19. The system of claim 14 further including a computer coupled to the tablet and to the cursor body for transferring data therebetween.

20. The system of claim 19 where the data includes the location of the cursor body on the tablet.

21. The system of claim 19 further including at least one actuator in the cursor body, where the sensor reports the position of the body to the computer in response to the actuator.

22. The system of claim 19 where a portion of the circuits are disposed in the computer.

23. A method for digitizing information on a document, comprising:
   presenting information within a predetermined area of the document to an operator optically through a transparent display element overlying the document;
   displaying a first electronically generated object on the same display element such that at least some of the predetermined area is visible to the operator;
   sensing a condition of the display element;
   in response to the condition, displaying a different electronically generated object on the transparent display element.

24. The method of claim 23 where the condition occurs with respect to a digitizing tablet underlying the document.

25. The method of claim 23 where sensing the condition comprises detecting a different position of the display element relative to the document.

26. The method of claim 23 where sensing the condition comprises detecting a different orientation of the display element relative to the document.

27. A method for digitizing information on a document, comprising:
   presenting information within a predetermined area of the document to an operator optically through a transparent display element overlying the document;
   displaying a first electronically generated object on the same display element such that at least some of the predetermined area is visible to the operator;
   sensing a condition of the display element;
   in response to the condition, displaying a different electronically generated object on the transparent display element,
   where the objects are crosshairs displayed at different orientations.

28. A method for digitizing information on a document, comprising:
   presenting information within a predetermined area of the document to an operator optically through a transparent display element overlying the document;
   displaying a first electronically generated object on the same display element such that at least some of the predetermined area is visible to the operator;
   sensing a condition of the display element;
   in response to the condition, displaying a different electronically generated object on the transparent display element,
   where the objects are different gradient patterns.

29. The method of claim 23 where sensing the condition comprises detecting an actuation of a control physically associated with the display element.

30. The method of claim 29 further comprising recording a position of the display element when the control is actuated.

31. The method of claim 23 further comprising presenting an image of the document and the position of the display element on a computer monitor as the display element moves with respect to the document.

* * * * *